(12) United States Patent
Shafiee Ardestani et al.

(10) Patent No.: US 12,158,923 B2
(45) Date of Patent: Dec. 3, 2024

(54) LOW OVERHEAD IMPLEMENTATION OF WINOGRAD FOR CNN WITH 3X3, 1X3 AND 3X1 FILTERS ON WEIGHT STATION DOT-PRODUCT BASED CNN ACCELERATORS

(71) Applicant: Samsung Electronics Co., Ltd., Suwon-si (KR)

(72) Inventors: Ali Shafiee Ardestani, Santa Clara, CA (US); Joseph Hassoun, Los Gatos, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 1066 days.

(21) Appl. No.: 16/898,422

(22) Filed: Jun. 10, 2020

(65) Prior Publication Data

US 2021/0294873 A1 Sep. 23, 2021

Related U.S. Application Data

(60) Provisional application No. 62/992,899, filed on Mar. 20, 2020.

(51) Int. Cl.
*G06F 17/14* (2006.01)
*G06F 17/15* (2006.01)
*G06N 3/04* (2023.01)
*G06N 3/045* (2023.01)

(52) U.S. Cl.
CPC .......... *G06F 17/144* (2013.01); *G06F 17/156* (2013.01); *G06N 3/04* (2013.01); *G06N 3/045* (2023.01)

(58) Field of Classification Search
CPC ............................... G06N 3/045; G06F 17/144
See application file for complete search history.

(56) References Cited

U.S. PATENT DOCUMENTS

| | | | |
|---|---|---|---|
| 10,372,787 | B2 | 8/2019 | Park et al. |
| 2004/0213146 | A1 | 10/2004 | Jones et al. |
| 2019/0042923 | A1 | 2/2019 | Janedula et al. |
| 2019/0114536 | A1 | 4/2019 | Tsung et al. |

*Primary Examiner* — Bijan Mapar
(74) *Attorney, Agent, or Firm* — Renaissance IP Law Group LLP (57) ABSTRACT

A system and a method are disclosed for forming an output feature map (OFM). Activation values in an input feature map (IFM) are selected and transformed on-the-fly into the Winograd domain. Elements in a Winograd filter is selected that respectively correspond to the transformed activation values. A transformed activation value is multiplied by a corresponding element of the Winograd filter to form a corresponding product value in the Winograd domain. Activation values are repeatedly selected, transformed and multiplied by a corresponding element in the Winograd filter to form corresponding product values in the Winograd domain until all activation values in the IFM have been transformed and multiplied by the corresponding element. The product values are summed in the Winograd domain to form elements of a feature map in the Winograd domain. The elements of the feature map in the Winograd domain are inverse-Winograd transformed on-the-fly to form the OFM.

12 Claims, 11 Drawing Sheets

| Time | 0 | 1 | 2 | 3 | 4 | 5 | 6 | 7 | 8 |
|---|---|---|---|---|---|---|---|---|---|
| Cache Control | SEL(a,c) T_ADD(a-c) | SEL(i,k) T_ADD(i-k) | SEL(e,g) T_ADD(e-g) | SEL(m,o) T_ADD(m-o) | SEL(b,d) T_ADD(b+d) | SEL(j,l) T_ADD(j+l) | SEL(f,h) T_ADD(f+h) | SEL(n,p) T_ADD(n+p) | ... |
| Hot Row Control | H1→STR(T) | H2→STR(T) ADD(H1-T) | H1→STR(T) ADD(H2-H1) | H2→STR(T) ADD(H1-H2) | H1→STR(T) ADD(H2+H1) | H2→STR(T) ADD(H1+T) | H1→STR(T) ADD(H2+H1) | H2→STR(T) ADD(H1+T) | ... |
| H1 | --- | a-c | a-c | e-g | e-g | b+d | f+h | f+h | f+h |
| H2 | --- | --- | i-k | i-k | m-o | m-o | j+l | j+l | n+p |
| Wino Activation | --- | --- | (e-g)+(i-k) | (i-k)-(e-g) | (e-g)-(m-o) | (b+d)-(j+l) | (f+h)+(j+l) | (j+l)-(f+h) | (f+h)-(n+p) |

Table 3.

LOW OVERHEAD IMPLEMENTATION OF WINOGRAD FOR CNN WITH 3X3, 1X3 AND 3X1 FILTERS ON WEIGHT STATION DOT-PRODUCT BASED CNN ACCELERATORS

CROSS-REFERENCE TO RELATED APPLICATION

This application claims the priority benefit under 35 U.S.C. § 119(e) of U.S. Provisional Application No. 62/992,899, filed on Mar. 20, 2020, the disclosure of which is incorporated herein by reference in its entirety.

TECHNICAL FIELD

The subject matter disclosed herein relates to convolutional neural networks (CNNs). More specifically, the subject matter disclosed herein relates to a system and a method that transforms activation values of an input feature map (IFM) on-the-fly to the Winograd domain, processes the activation values in the Winograd domain, and inverse-Winograd transforms the processed activation values to form elements of an output feature map (OFM).

BACKGROUND

Weight values may be transformed to the Winograd domain offline and stored after a CNN has been trained because the weight values typically do not change after a CNN has been trained. When the CNN is operating in an inference mode, however, the activation values cannot be conveniently transformed to the Winograd domain offline because the values of the IFMs change based on a current input to the CNN. Additionally, converting activation values to the Winograd domain and storing the values for use during an inference-mode operation may adversely impact the speed of performance of the CNN.

SUMMARY

An example embodiment provides a method to form an OFM that may include: selecting activation values in an IFM in each of a predetermined number of input channels in which each IFM includes a first predetermined size, and a position in the IFM of each selected activation value is a same position as selected activation values in other IFMs from which the other selected activation values are selected; transforming on-the-fly the selected activation values to a Winograd domain; selecting an element in a Winograd filter in each of the predetermined number of input channels in which each Winograd filter corresponds to a kernel filter that is the first predetermined size, each selected element in a Winograd filter corresponds to an activation value in the Winograd domain, and a position of each respective element in the Winograd filter from which the element is selected is a same position as another selected element in the Winograd filter from which the another element is selected; multiplying a transformed activation value in the Winograd domain by a corresponding element in a Winograd filter to form a corresponding product value in the Winograd domain; repeatedly selecting activation values from an IFM in each of the predetermined number of input channels, transforming the selected activation values on-the-fly to the Winograd domain, selecting an element in a Winograd filter that corresponds to a currently transformed activation value in the Winograd domain, and multiplying the currently transformed activation value and the corresponding element to form a corresponding product value in the Winograd domain until all activation values of the IFM have been transformed and multiplied by the corresponding element; summing the respective product values in the Winograd domain to form elements of a feature map in the Winograd domain; and inverse-Winograd transforming on-the-fly the elements of the feature map in the Winograd domain to form an OFM in which the OFM is a second predetermined size.

An example embodiment provides a method to form an OFM that may include: selecting activation values in an IFM in each of a predetermined number of input channels in which each IFM is a first predetermined size; transforming on-the-fly the selected activation values to a Winograd domain; selecting an element in a Winograd filter in each of the predetermined number of input channels in which each Winograd filter is the first predetermined size, and each selected element of the Winograd filter corresponds to a transformed activation value in the Winograd domain; multiplying a transformed activation value in the Winograd domain by a corresponding element to form a corresponding product value in the Winograd domain; repeatedly selecting activation values in the Winograd domain from an IFM in each of the predetermined number of input channels, transforming the selected activation values on-the-fly to the Winograd domain, selecting an element in a Winograd filter that corresponds to a currently transformed activation value in the Winograd domain, and multiplying the currently transformed activation value in the Winograd domain and the corresponding element to form a corresponding product value in the Winograd domain until all activation values in the IFM have been transformed and multiplied by the corresponding element; summing the respective product values in the Winograd domain to form elements of a feature map in the Winograd domain; and inverse-Winograd transforming on-the-fly the feature map in the Winograd domain to form an OFM in which the OFM is a second predetermined size.

An example embodiment provides a system to convolve IFM values with weight kernel values, the system may include: a first memory that stores activation values of an IFM for each of a predetermined number of input channels in which each IFM is a first predetermined size; a pipelined structure that selects activation values from an IFM in each of the predetermined number of input channels in which a position in the IFM of each selected activation value is a same position as selected activation values in other IFMs from which the other selected activation values are selected, and in which the pipelined structure transforms on-the-fly the selected activation values to a Winograd domain; a second memory that stores elements of a Winograd filter for each of the predetermined number of input channels in which each Winograd filter corresponds to a kernel filter comprising the first predetermined size; a multiplier that multiplies a transformed activation value in the Winograd domain by a selected element from a Winograd filter to form a corresponding product value in the Winograd domain in which each selected element in a Winograd filter corresponds to an activation value in the Winograd domain, and a position of each respective element in the Winograd filter from which the element is selected is a same position as another selected element in the Winograd filter from which the another element is selected; an adder tree that sums the respective product values in the Winograd domain to form elements of a feature map in the Winograd domain; and inverse-Winograd transformer that transforms on-the-fly the elements of the feature map in the Winograd domain to form an OFM for storage in the memory in which the OFM is a second predetermined size.

BRIEF DESCRIPTION OF THE DRAWING

In the following section, the aspects of the subject matter disclosed herein will be described with reference to exemplary embodiments illustrated in the figure, in which.

DETAILED DESCRIPTION

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail not to obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not be necessarily all referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout." etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. Similarly, various waveforms and timing diagrams are shown for illustrative purpose only. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising." when used in this specification, specify the presence of stated features, integers, steps, operations, elements, and/or components, but do not preclude the presence or addition of one or more other features, integers, steps, operations, elements, components, and/or groups thereof. The terms "first." "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and case of discussion only; it does not imply that the construction or architectural details of such components or units are the same across all embodiments or such commonly-referenced parts/modules are the only way to implement some of the example embodiments disclosed herein.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first." "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The subject matter disclosed herein allows activation values to be converted to the Winograd domain on-the-fly so that a reduced number of multiplication operations that are performed when convolving the activation values with the weight values in the Winograd domain may be used to improve both speed of performance of a CNN and reduce power consumption of the CNN.

Figure 1A:
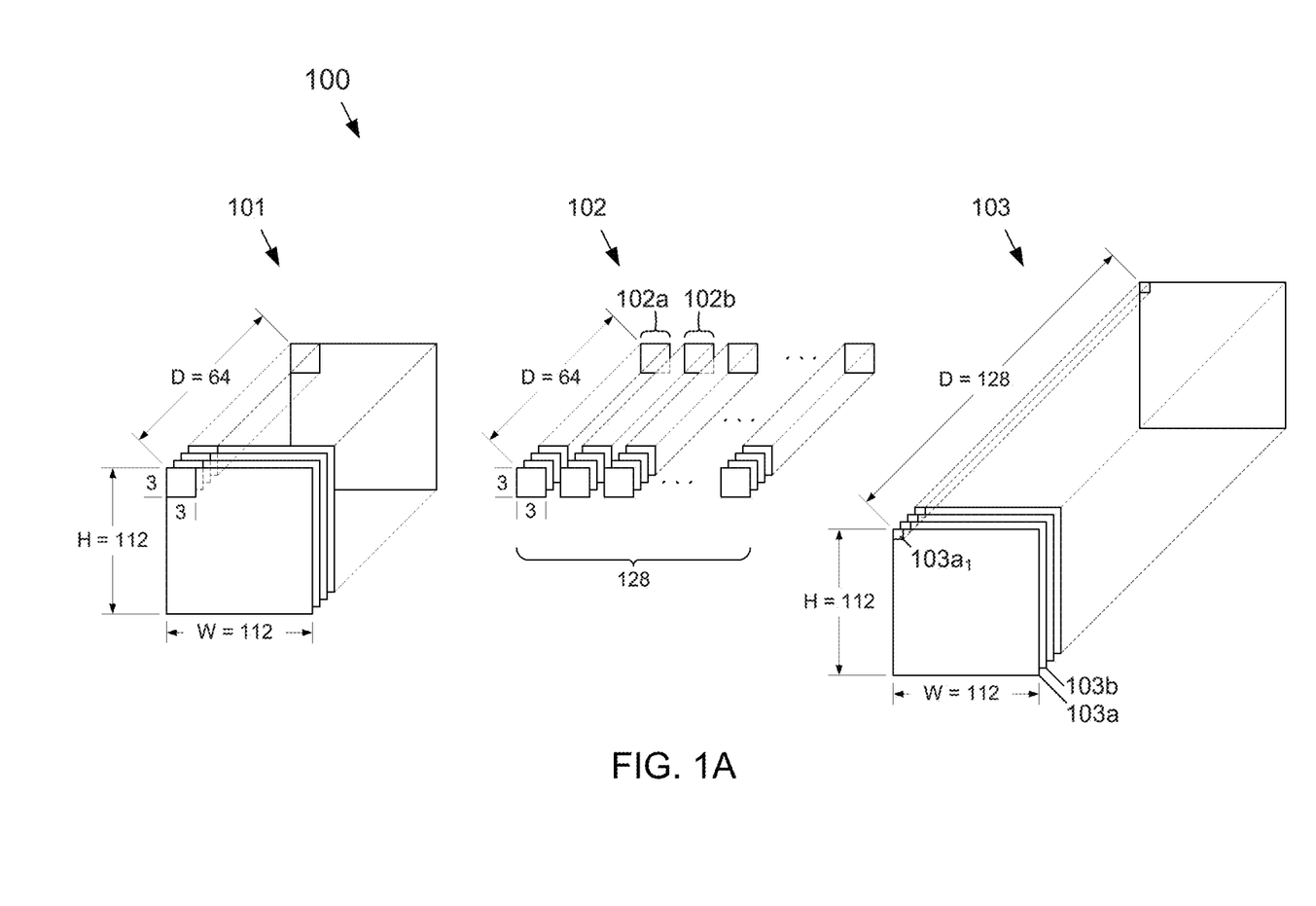
FIG. 1A depicts a block diagram on an example embodiment of an architecture of a CNN that may be used to convolve activation values and weight values according to the subject matter disclosed herein.

FIG. 1A depicts a block diagram on an example embodiment of an architecture 100 of a CNN that may be used to convolve activation values and weight values according to the subject matter disclosed herein. The architecture 100 includes a plurality of IFMs 101 and a plurality of weight kernels (or filters) 102 that when convolved generate a plurality of OFMs 103.

As depicted in FIG. 1A, the plurality of IFMs 101 may include 64 IFMs in which each IFM may be a 112×112 element IFM. Each IFM 101 may be referred to as a lane or as a channel. The elements of the IFMs may also be referred to as activations or as activation values. The plurality of weight kernels 102 may include 128 kernel filters in which each kernel filter may include 64 3×3 weight kernels. The plurality of OFMs 103 may include 128 OFMs in which each OFM may be a 112×112 element OFM. The number of IFMs, weight kernels and OFMs may be different from those indicated in FIG. 1A. Also, other IFM and filter sizes may be used to obtain different sizes of OFMs.

A process that may be used to generate OFMs 103 from the IFMs 101 and weight kernels 102 may be as follows. A first group 102a of weight kernels 102, which may include 64 3×3 weight kernels, may be selected and each respective weight kernel of the first group is associated with a 3×3 patch of a corresponding IFM 101. For example, as depicted in FIG. 1A, each respective 3×3 weight kernel in the 64-member group 102a is associated with the upper left-most 3×3 patch of a corresponding IFM 101 of the 64 IFMs. The elements of each 3×3 weight kernel are element-wise multiplied with the elements of the corresponding 3×3 IFM patch to form nine product-value elements in 64 intermediate feature maps (not shown). The product-value elements in the same corresponding positions in each of the 64 intermediate feature maps are summed to form a single 1×1 patch (or element) 103a1, indicated at the upper left-most position of a first OFM 103a.

The first group of weight kernels 102a may then be moved (or strided) horizontally to the right across IFMs 101 by one element, the first group of weight filters 102a is associated with another 3×3 patch of a corresponding IFM 101. The elements of each 3×3 weight kernel are element-wise multiplied with the elements of the corresponding 3×3 IFM patch of the new set of IFM patches to form nine product-value elements in 64 intermediate feature maps (again, not shown). The product-value elements in the same corresponding positions in each of the 64 intermediate feature maps are summed to form another single 1×1 patch (or element) 103a1 of a first OFM 103, which would be placed horizontally to the immediate right of the patch 103a1. The first group of weight filters 102a may be moved (or strided) horizontally and vertically across the IFMs 101 based on horizontal and vertical strides to form all of the individual elements of the OFM 103a.

A second group 102b of weight kernels is selected and each respective weight kernel of the second group is associated with a 3×3 patch of a corresponding IFM 101. For example, as would be depicted in FIG. 1A, each respective 3×3 weight kernel in the 64-member group 102b is associated with the upper left-most 3×3 patch of a corresponding IFM 101 of the 64 IFMs. The elements of each 3×3 weight kernel are element-wise multiplied with the elements of the corresponding 3×3 IFM patch to form nine product-value elements in 64 intermediate feature maps (not shown). The product-value elements in the same corresponding positions in each of the 64 intermediate feature maps are summed to form a single 1×1 patch (or element) at the upper left-most position of a second OFM 103b.

The second group 102b of weight kernels may be strided horizontally and vertically across the IFMs 101, as described before, to form corresponding patches of elements in the second OFM 103b. The 128 groups of weight filters are selected and applied to the IFMs 101 to form the elements of the 128 OFMs.

Figure 1B:
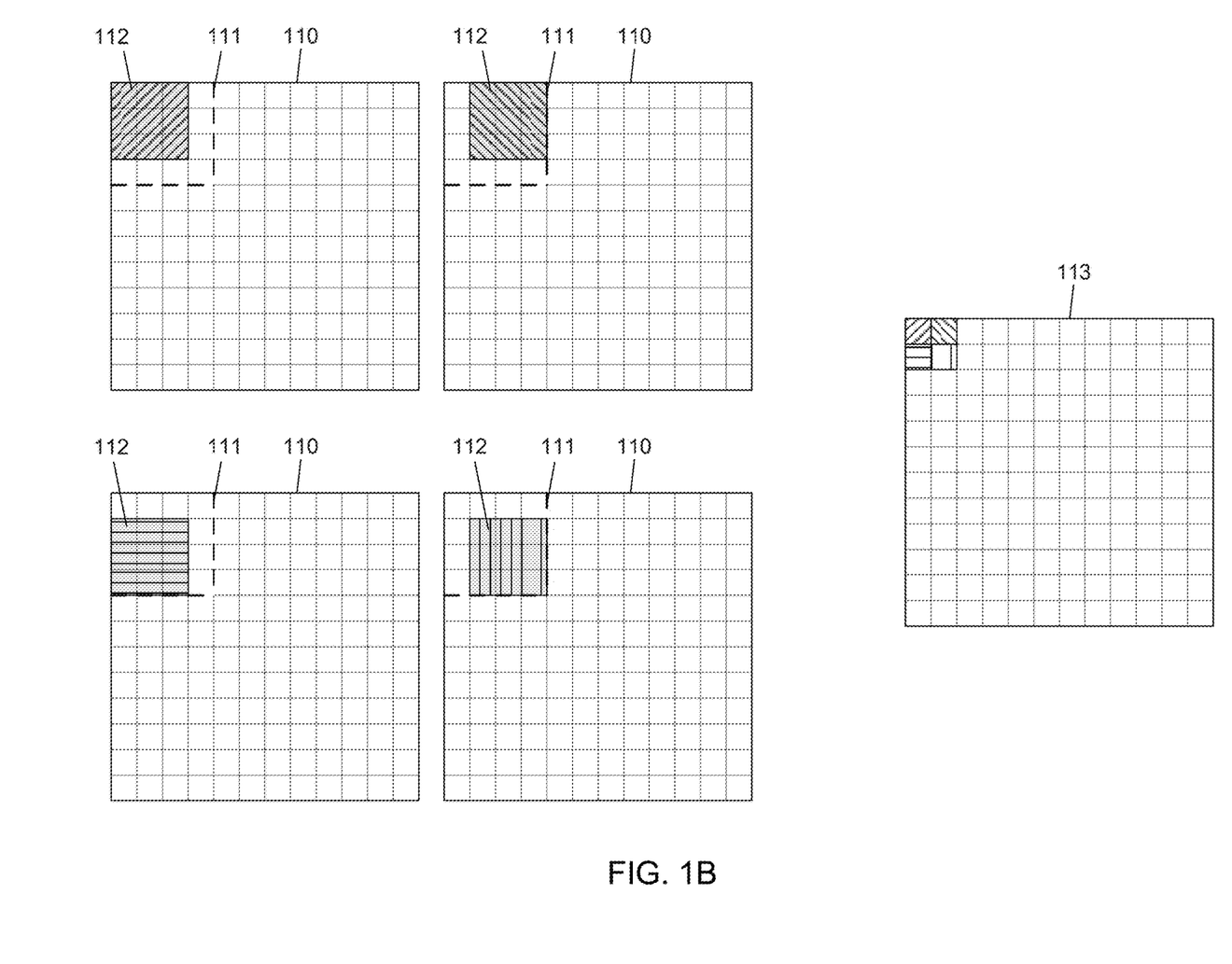
FIG. 1B depicts four positions of a 3×3 weight kernel as it is strided across elements of a corresponding example IFM to form four elements of an example OFM.

FIG. 1B depicts four positions of a 3×3 weight kernel 112 as it is strided across elements of a corresponding example IFM 110 to form four elements of an example OFM 113. The weight kernel 112, depicted by a gray shading, may be moved horizontally and vertically to cover a 4×4 patch 111 of the IFM 110. Each respective portion of the patch 111 is indicated by a cross-hatching of a different direction. The cross-hatching of an element in the OFM 113 indicates the portion of the 4×4 patch in the IFM 110 from which the OFM element was formed. Each element in the OFM 113 is formed by nine multiplication operations and nine addition operations. For the four OFM elements indicated in FIG. 1B, a total of 36 multiplication operations and 36 addition operations are performed. The relative complexity of each multiplication operation (and power consumption) is significantly greater than the complexity for an addition operation, so the overall complexity of forming a single element of the OFM 113 may be well approximated by referring to only the number of multiplication operations used to form the element. Thus, 36 multiplication operations will be referred to herein as needing to be performed to form the four elements of the OFM 113 indicated in FIG. 1B.

Figure 1C:
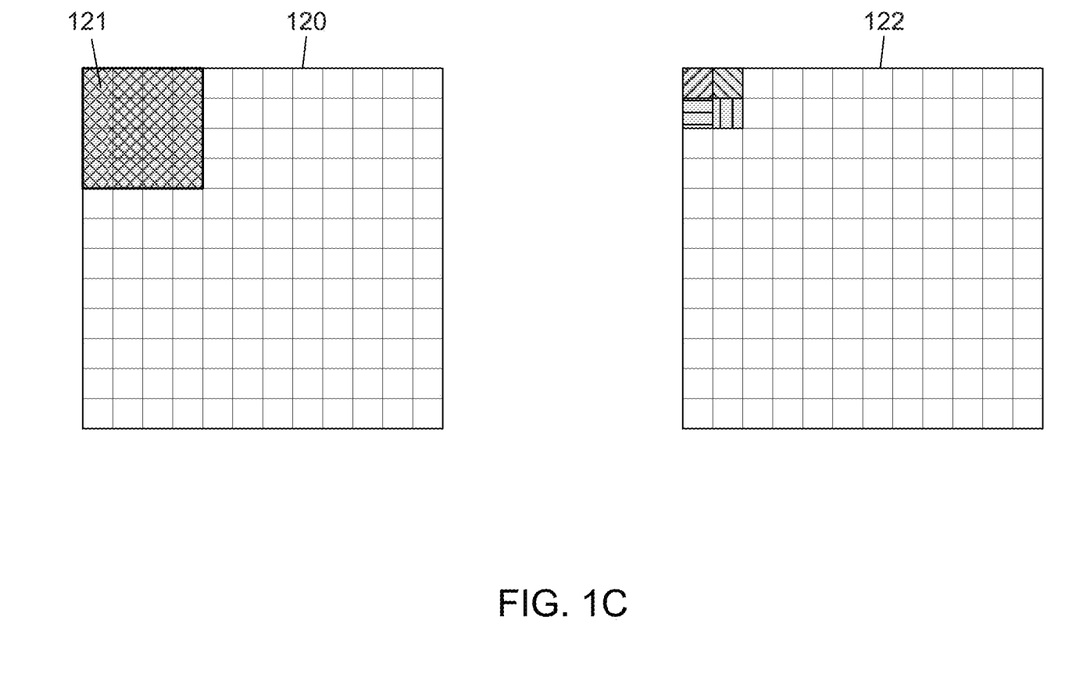
FIG. 1C depicts a position of a Winograd filter with respect to elements of a corresponding example IFM to form four elements of an example OFM.

FIG. 1C depicts a position of a Winograd filter 121 with respect to elements of a corresponding example IFM 120 to form four elements of an example OFM 122. The elements in the IFM 120 have been transformed into the Winograd domain. The 4×4 elements of the Winograd filter 121 have been transformed into the Winograd domain from a 3×3 weight filter (not shown). Because both the IFM 120 and the Winograd filter 121 are both in the Winograd domain, the elements of the OFM 122 are also in the Winograd domain.

The four elements indicted in the OFM 122 in FIG. 1C correspond to the four elements in the OFM 113 in FIG. 1B. To form the four elements in the OFM 122, an element-wise multiplication is performed between the elements of the IFM 120 and the elements of the Winograd filter 121, resulting in a total of 16 multiplication operations, which is a significant reduction in multiplication operations in comparison to the 36 multiplication operations that are performed when the activation and weight values are not in the Winograd domain. The number of multiplication operations that are performed when the elements are in the Winograd domain compares very favorably to the number of multiplication operations that are needed when the elements are not in the Winograd domain.

The elements of the Winograd filter 121 may be formed offline, so no additional overhead is needed during an inference operation of an architecture that may be used to convolve activation and weight values, such as architecture 100. Conversion of the elements of an IFM into the Winograd domain and conversion of a resulting OFM are addition-based operations, and may be performed on-the-fly as described herein.

The equations below provide a mathematical explanation for converting activation values in a 4×4 patch of an IFM to the Winograd domain. In the equations, A is a matrix used to convert a 4×4 patch of an IFM to the Winograd domain, $A^T$ is a transpose of the matrix A, act is an activation value, w is a weight value, and i is an index.

$$A = \begin{bmatrix} 1 & 0 \\ 1 & 1 \\ 1 & -1 \\ 0 & -1 \end{bmatrix} \quad (1)$$

$$OFM_{2\times 2} = $$

$$\sum_{i \in IFMs} OFM_{2\times 2}^i = \sum_{i \in IFMs} A^T \times \begin{pmatrix} act_0^i \times w_0^i & \cdots & act_3^i \times w_3^i \\ \vdots & \ddots & \vdots \\ act_{12}^i \times w_{12}^i & \cdots & act_{15}^i \times w_{15}^i \end{pmatrix} \times A \quad (2)$$

$$= A^T \times \begin{pmatrix} \sum_{i \in IFMs} act_0^i \times w_0^i & \cdots & \sum_{i \in IFMs} act_3^i \times w_3^i \\ \vdots & \ddots & \vdots \\ \sum_{i \in IFMs} act_{12}^i \times act_{12}^i & \cdots & \sum_{i \in IFMs} act_{15}^i \times w_{15}^i \end{pmatrix} \times A \quad (3)$$

$$= A^T \times \begin{pmatrix} \sum_{i \in IFMs} act_0^i & \cdots & 0 \\ \vdots & \ddots & \vdots \\ 0 & \cdots & 0 \end{pmatrix} \times A + \quad (4)$$

$$\cdots + A^T \begin{pmatrix} 0 & \cdots & 0 \\ \vdots & \ddots & \vdots \\ 0 & \cdots & \sum_{i \in IFMs} act_{15}^i \times w_{15}^i \end{pmatrix} \times A^T$$

$$= A_0^T \times \sum_{i \in IFMs} act_0^i \times w_0^i \times A_0 + \cdots + A_{15}^T \times \sum_{i \in IFMs} act_{15}^i \times w_{15}^i \times A_{15} \quad (5)$$

$$A_0^T = \begin{bmatrix} 1 \\ 0 \end{bmatrix} \quad (6)$$

$$A_0 = \begin{bmatrix} 1 & 0 \end{bmatrix} \quad (7)$$

Figure 1D:
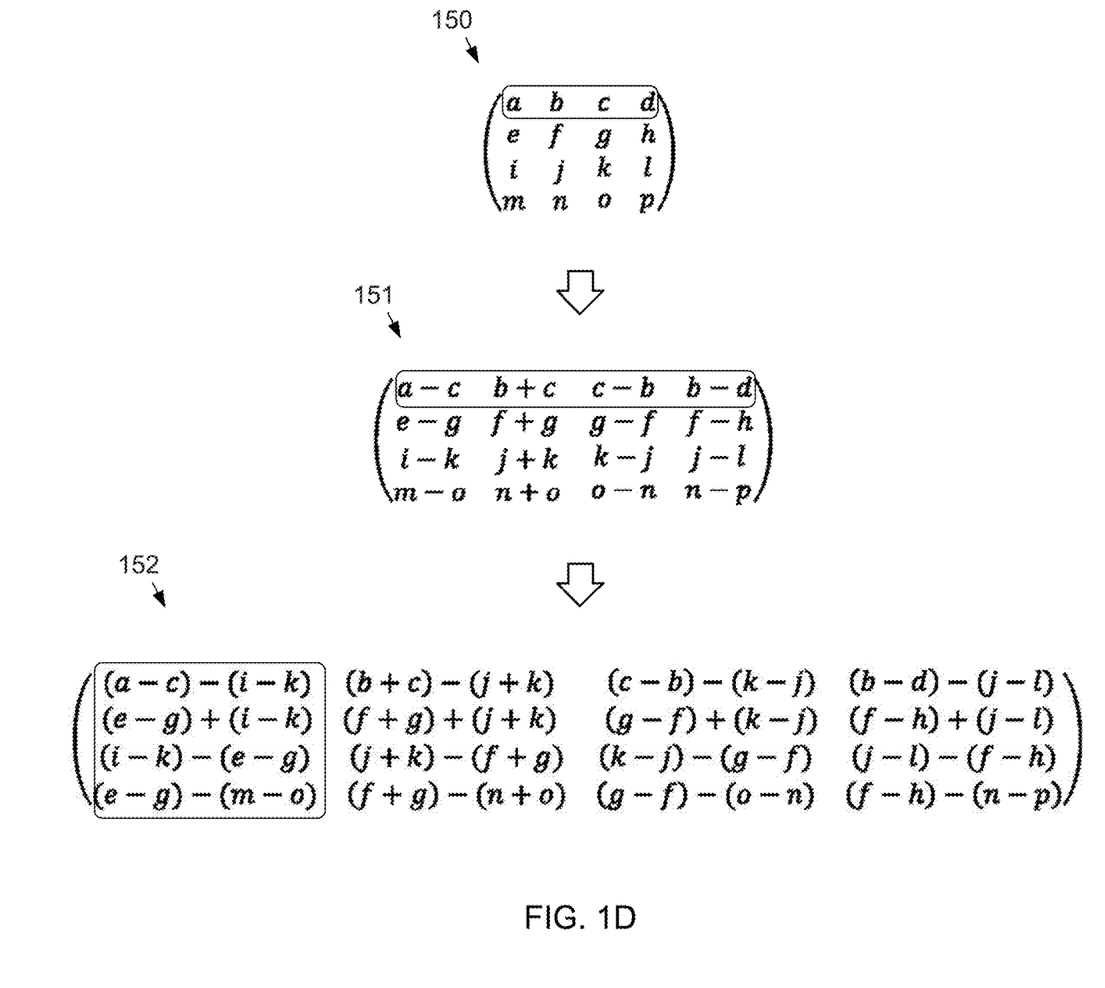
FIG. 1D depicts operations performed on a 4×4 matrix of elements, such as activation values, based on Eqs. (1)-(7) to transform the elements into the Winograd domain.

FIG. 1D depicts operations performed on a 4×4 matrix of elements, such as activation values, based on Eqs. (1)-(7) to transform the elements into the Winograd domain. More specifically, an example 4×4 matrix (or patch of an IFM) containing elements a-p is shown at 150 in FIG. 1D. The example matrix is partially transformed into the Winograd domain at 151, and is completely transformed into the Winograd domain at 152.

Transformation of a row of elements into the Winograd domain may be performed as follows. The value in the first column of a row is obtained by subtracting the value in the third column of the row from the value in the first column of the row. The value in the second column of the row is obtained by adding the value in the second column to the value in the third column of the row. The value in the third column of the row is obtained by subtracting the value in the second column of the row from the value in the third column. The value in the fourth column of the row is obtained by subtracting the value in the fourth column from the value in the second column of the row. This sequence may be observed referring to the row of elements outlined at 150 to the row of elements that are outlined at 151.

The transformation continues by operating on the columns of the partially transformed matrix 151 as follow. The value in the first row of a column is obtained by subtracting the value in the third row of the column from the value in the first row of the column. The value in the second row of the column is obtained by adding the value in the second row to the value in the third row of the column. The value in the third row of the column is obtained by subtracting the value in the second row of the column from the value in the third row. The value in the fourth row of the column is obtained by subtracting the value in the fourth row from the value in the second row of the column. This sequence may be observed by referring to the column of elements that are outlined at 152 to the first column of elements of the partially transformed matrix 151.

Weight values may be transformed to the Winograd domain offline and stored after a CNN has been trained because the weight values typically do not change when the CNN is operating in an inference mode. The activation values, however, do change in the inference mode and to convert the activation values to the Winograd domain in the inference mode may include extra accesses to the activation values in memory, which is not energy efficient. Additionally, converting activation values to the Winograd domain and storing the values for use during an inference-mode operation may adversely impact the speed of performance of the CNN.

Although a 3×3 weight kernel has been used as an example, other weight kernels that may also be used with the technique disclosed herein includes a 3×1 weight kernel and a 1×3 weight kernel. For a 1×3 weight kernel and a 3×1 weight kernel, a 1×4 and 4×1 patches of an IFM are respectively used. In contrast to a 3×3 weight kernel case in which activation transformation is applied row-wise transformation followed by column-wise transformation, transformation of a 1×4 IFM patch is only a row-wise transformation, and transformation of a 4×1 IFM patch is only a column-wise transformation.

Figure 2A:
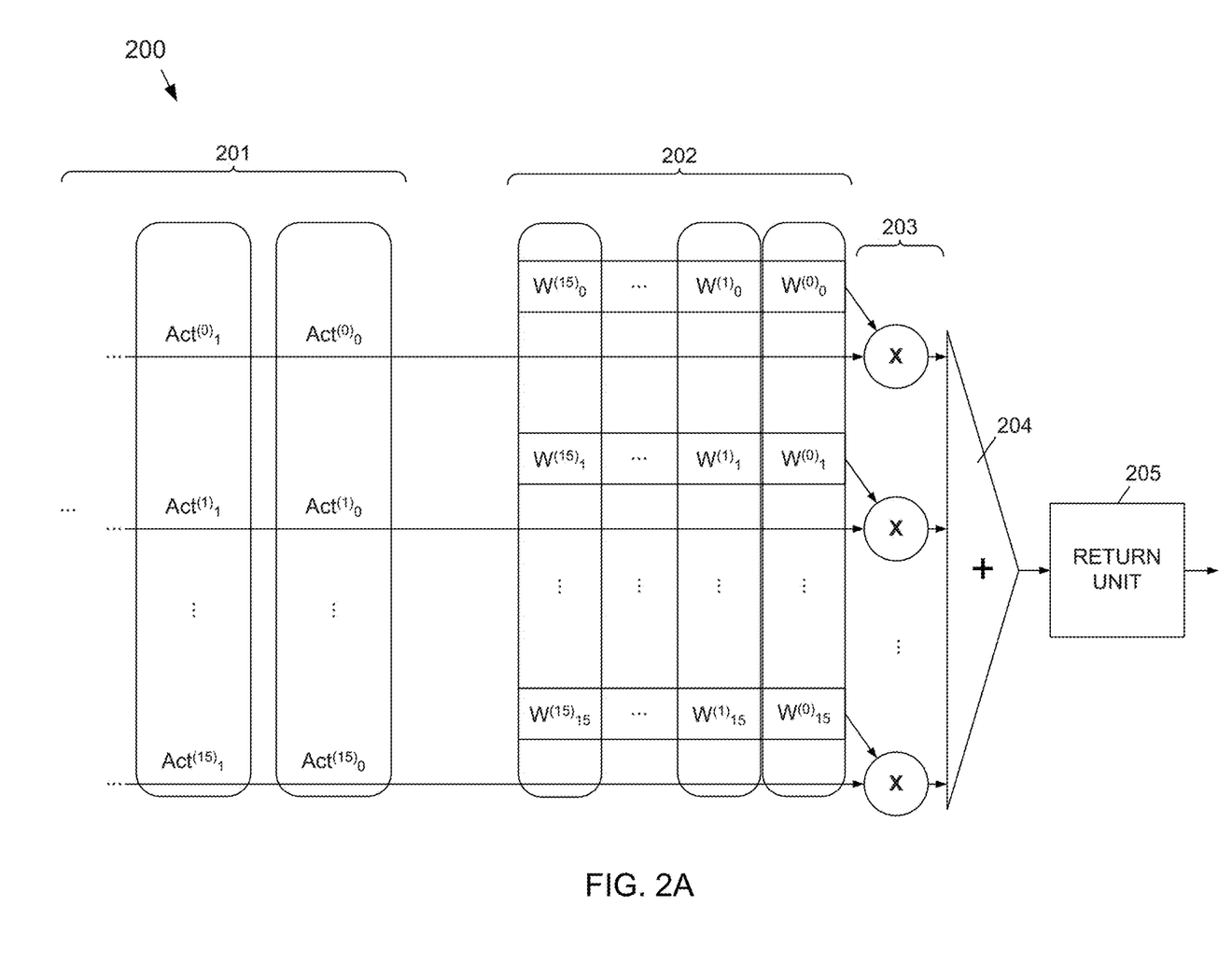
FIG. 2A depicts a functional block diagram of an example embodiment of a system that may be used to multiply activation element values of a group of IFMs (or lanes) by corresponding weight value elements according to the architecture of a CNN depicted in FIG. 1A.

FIG. 2A depicts a functional block diagram of an example embodiment of a system 200 that may be used to multiply activation element values of a group of IFMs (or lanes) by corresponding weight value elements according to the architecture 100 of a CNN depicted in FIG. 1A. The system 200 may be used when both the activation values and the weight values are in the same domain. The system 200 may be arranged to process, for example, a group of 16 IFMs, and may include an activation value buffer 201, a weight value buffer 202, multipliers 203, an adder tree 204 and a return unit 205. The activation value buffer (or cache) 201 and the weight value buffer (or cache) 202 may be organized so that the activation elements of a patch of an IFM and the corresponding weight values may be accessed in parallel. The patch depicted in FIG. 2A may be, for example, a 4×4 patch. Accordingly, the weight filter may also be a 4×4 weight filter. Other patch and filter sizes may be used. The nomenclature used in FIG. 2A is that activation values are indicated by "Act" in which the subscript corresponds to a lane or channel number, and a superscript corresponds to a position in a patch. Weight values are indicated by a "W" with the same subscript and superscript convention.

The multipliers 203 respectively multiply the activation values by a corresponding weight value. The adder tree 204 adds the resulting products output from the multipliers 203. The output of the adder tree 204 is input of a return unit 205 that may convert the output of the adder tree 204 from the Winograd domain to the original domain of the activation values. The return unit 205 may also buffer the output of adder tree 204 so that output may be added to the output of other adders (not shown) to form an element of an OFM before being returned to a memory (not shown) for subsequent processing at another layer of the CNN.

Figure 2B:
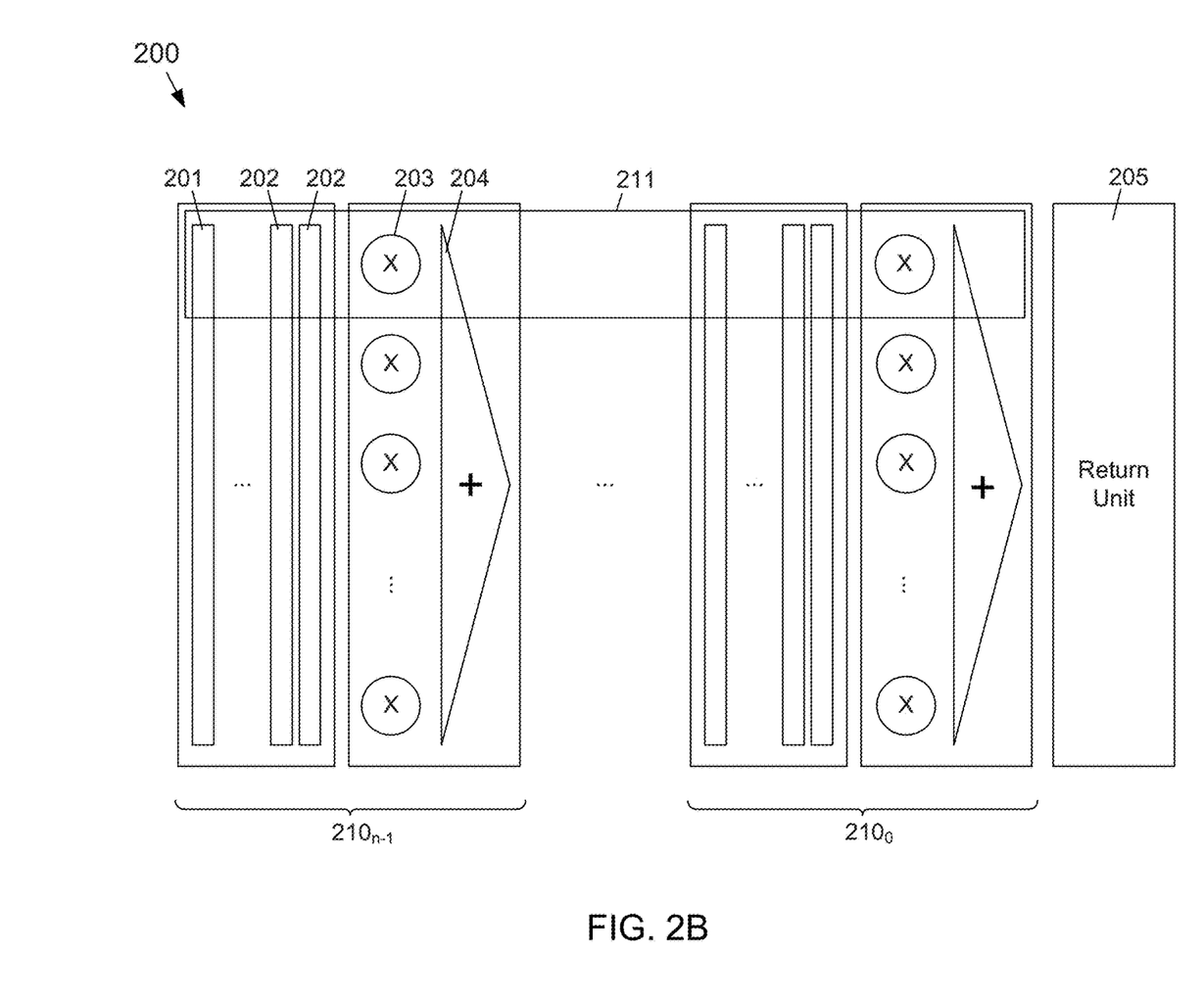
FIG. 2B depicts another functional block diagram of an example embodiment of the system that may operate to multiply activation element values of the IFMs by corresponding weight value elements according to the architecture of a CNN depicted in FIG. 1A.

FIG. 2B depicts another functional block diagram of an example embodiment of the system 200 that may operate to multiply activation element values of the IFMs by corresponding weight value elements according to the architecture 100 of a CNN depicted in FIG. 1A. As depicted in FIG. 2A, the system 200 includes n groups 2100-210n-1 in which each group processes 16 lanes of IFMs of the architecture 100 to produce OFMs 103. If, for example, a group includes 16 lanes and the architecture 100 includes a total of 64 lanes, then n in FIG. 2B would equal 4. The rectangle 211 in FIG. 2B represents the functional components that generate one element of an OFM 103.

As previously mentioned, it may be convenient to have the weight values converted to the Winograd domain because the conversion process may be done offline after the CNN has been trained. On the other hand, however, converting activation values to the Winograd domain when a CNN is operating in an inference mode may adversely impact the speed of performance of the CNN. The subject matter disclosed herein allows activation values to be converted to the Winograd domain on-the-fly so that a reduced number of multiplication operations that are performed when convolving the activation values with the weight values in the Winograd domain may be used to improve both speed of performance of a CNN and a reduce power consumption of the CNN.

Figure 3A:
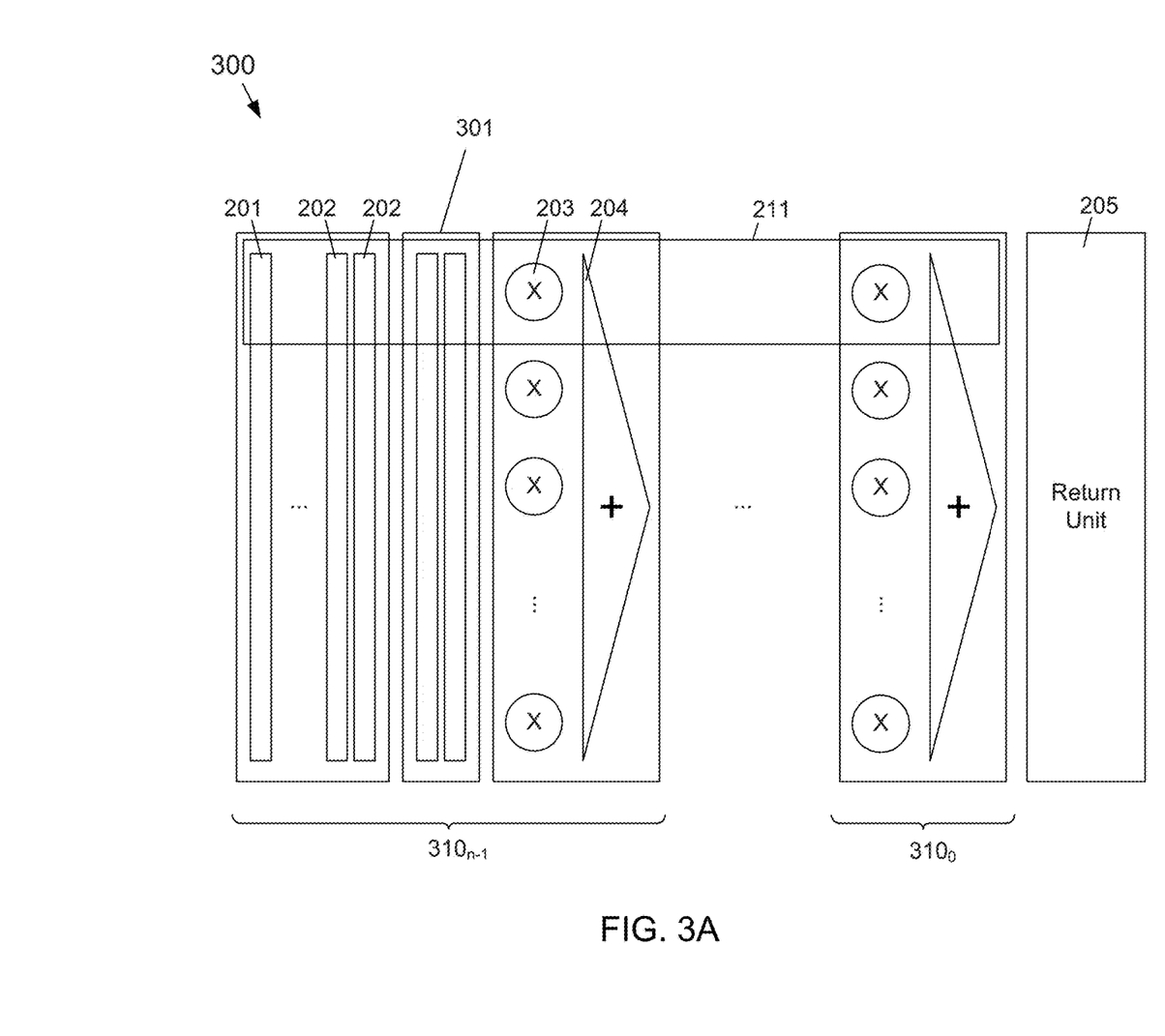
FIG. 3A depicts a functional block diagram of an example embodiment of a system that converts activation values to the Winograd domain on-the-fly so that the activation elements and the elements of the Winograd filters may be convolved according to the subject matter disclosed herein.

FIG. 3A depicts a functional block diagram of an example embodiment of a system 300 that converts activation values to the Winograd domain on-the-fly so that the activation elements and the elements of the Winograd filters may be convolved according to the subject matter disclosed herein. The system 300 is similar to the system 200 in FIG. 2B, but includes hot rows that are indicated at 301. As shown in FIG. 1D, the on-the-fly Winograd transformation of activation values for 3×3 weight kernels includes two phases of one-dimensional Winograd transformation-one phase on each row and one phase on each column. The hot rows serve as intermediate registers that store intermediate results during the two-phase transformation.

Figure 3B:
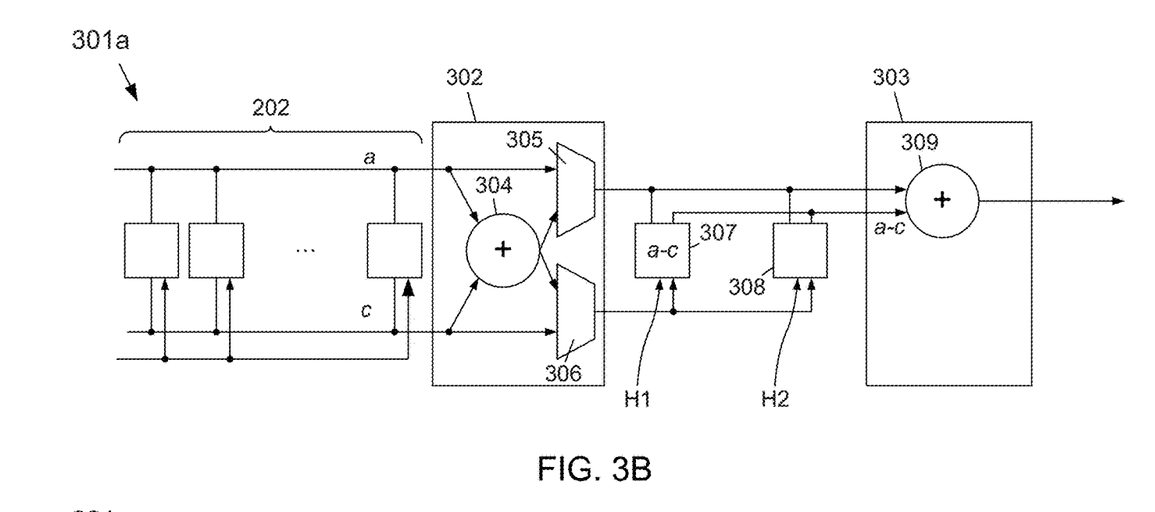
FIG. 3B depicts details of a row during a first cycle according to the subject matter disclosed herein.
Figure 3C:
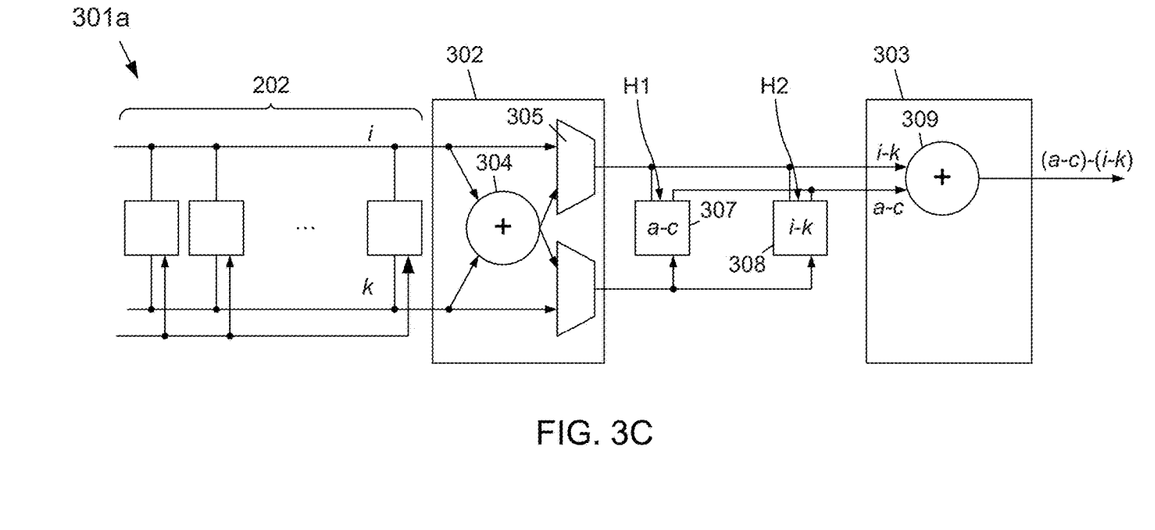
FIG. 3C depicts the hot row of FIG. 3B a during a second cycle according to the subject matter disclosed herein.

FIG. 3B depicts details of a row 301a of the hot rows 301 during a first cycle according to the subject matter disclosed herein. FIG. 3C depicts the hot row 301a during a second cycle. The hot row 301a may include a first processing element (PE) 302 and a second PE 303. The PE 302 may include an adder 304, a first multiplexer 305 and a second multiplexer 306 that are connected as shown. There may be two registers 307 and 308 that are connected as shown between the PE 302 and the PE 303 to hold intermediate results output from the PE 302. The PE 303 may include an adder 309 that is connected as shown.

Figure 3D:
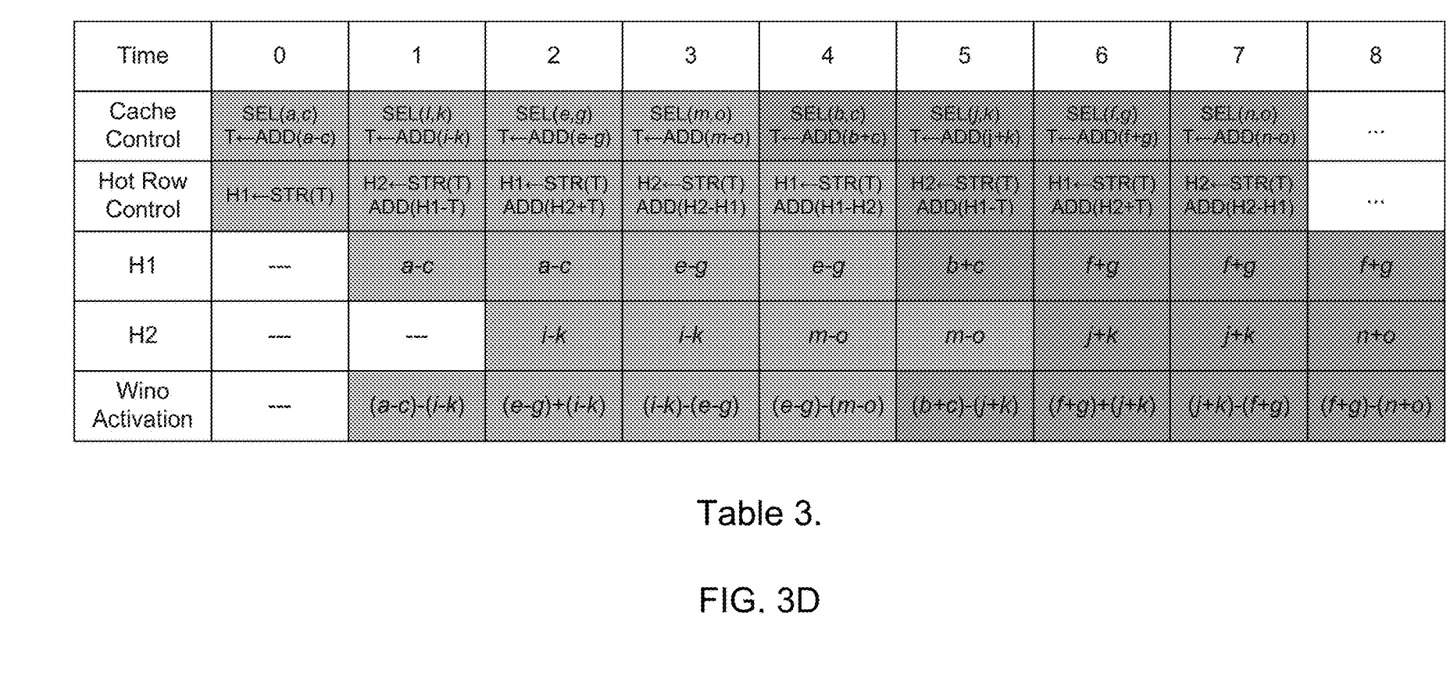
FIG. 3D is a table that shows additional details of the operation of the hot row 301a according to the subject matter disclosed herein.

Referring to the matrix 152 shown in FIG. 1D and Table 3 shown in FIG. 3D, during a first cycle (FIG. 3B) the elements a and c are selected and input to the adder 304. The adder 304 outputs a-c, which is stored in the register 307, and which is input to the adder 309. During a second cycle (FIG. 3C), elements i and k are selected and input to the adder 304. The adder outputs i-k, which is stored in the register 308, and which is input to the adder 309. The adder output (a-c)-(i-k), with is the upper leftmost element in the matrix 152.

Table 3 shows additional details of the operation of the hot row 301a. The row in Table 3 labeled Time indicates time in cycles. The row in Table 3 labeled Cache Control indicates which activation values are selected in the activation value cache 202, and the row labeled Hot Row Control indicates how the hot row is being controlled to output a desired activation value in the Winograd domain. The rows H1 and H2 indicate the two hot rows. The row labeled Wino Activation is the activation value that is output in the Winograd domain.

The entries in Table 3 that are a lighter shade of gray relate to the operation of the hot row 301a to generate the activation values in the leftmost column of the matrix at 152, whereas the entries that are a darker shade of gray relate to the operation of the hot row 301a to generate the activation values in the second from the left column of the matrix at 152.

Figure 4:
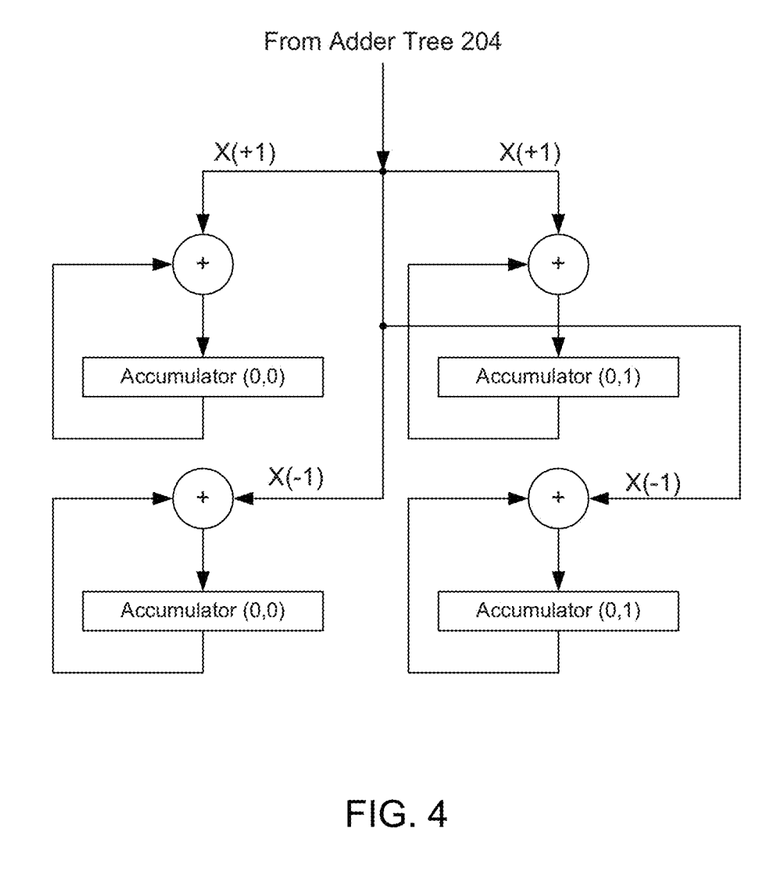
FIG. 4 depicts a functional block diagram of an example embodiment of an inverse-Winograd transformer that may inverse-Winograd transform the output of the adder tree in, for example, FIG. 2A from the Winograd domain back to the original domain of the activation values on-the-fly according to the subject matter disclosed herein

FIG. 4 depicts a functional block diagram of an example embodiment of an inverse-Winograd transformer that may inverse-Winograd transform the output of the adder tree 204 (FIG. 2A) from the Winograd domain back to the original domain of the activation values on-the-fly according to the subject matter disclosed herein. That is, the inverse-Winograd transformer 400 may transform the four elements indicated in the OFM 122 (FIG. 1C) from the Winograd domain on-the-fly back to their original domain. The inverse-Winograd transformer 400 includes four adders 401-404 and four accumulators 405-408, which are connected as shown. The result from the adder tree 204 is input to each respective adder 401-404 as input X having a sign change as indicated in FIG. 4. The functionality of the inverse-Winograd transformer 400 corresponds to the matrices A of Eq. (1) and the transpose $A^T$, as indicated in Eq. (4).

Figure 5:
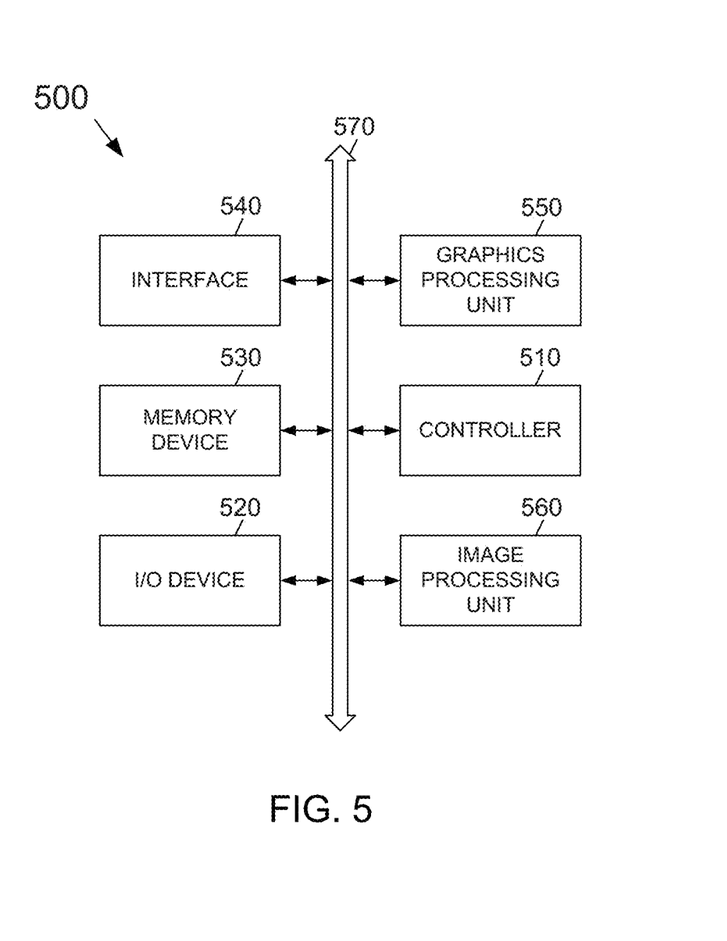
FIG. 5 depicts an electronic device that includes a CNN that transforms activation values of an IFM on-the-fly into the Winograd domain according to the subject matter disclosed herein.

FIG. 5 depicts an electronic device 500 that includes a CNN that transforms activation values of an IFM on-the-fly into the Winograd domain according to the subject matter disclosed herein. Electronic device 500 may be used in, but not limited to, a computing device, a personal digital assistant (PDA), a laptop computer, a mobile computer, a web tablet, a wireless phone, a cell phone, a smart phone, a digital music player, or a wireline or wireless electronic device. The electronic device 500 may also be part of, but not limited to, an ADAS, a mobile-device imaging system, an industrial imaging system, robotics, etc. The electronic device 500 may include a controller 510, an input/output device 520 such as, but not limited to, a keypad, a keyboard, a display, a touch-screen display, a camera, and/or an image sensor, a memory 530, an interface 540, a GPU 550, and an imaging processing unit 560 that are coupled to each other through a bus 570. The controller 610 may include, for example, at least one microprocessor, at least one digital signal processor, at least one microcontroller, or the like. The memory 530 may be configured to store a command code to be used by the controller 510 or a user data.

Electronic device 500 and the various system components of electronic device 500 may include the image processing unit 560, which includes a CNN that transforms activation values of an IFM on-the-fly into the Winograd domain according to the subject matter disclosed herein. The interface 540 may be configured to include a wireless interface that is configured to transmit data to or receive data from a wireless communication network using a RF signal. The wireless interface 540 may include, for example, an antenna, a wireless transceiver and so on. The electronic system 500 also may be used in a communication interface protocol of a communication system, such as, but not limited to, Code Division Multiple Access (CDMA), Global System for Mobile Communications (GSM), North American Digital Communications (NADC), Extended Time Division Multiple Access (E-TDMA), Wideband CDMA (WCDMA), CDMA2000, Wi-Fi, Municipal Wi-Fi (Muni Wi-Fi), Bluetooth, Digital Enhanced Cordless Telecommunications (DECT), Wireless Universal Serial Bus (Wireless USB), Fast low-latency access with seamless handoff Orthogonal Frequency Division Multiplexing (Flash-OFDM), IEEE 802.20, General Packet Radio Service (GPRS), iBurst, Wireless Broadband (WiBro), WiMAX, WiMAX-Advanced, Universal Mobile Telecommunication Service-Time Division Duplex (UMTS-TDD), High Speed Packet Access (HSPA), Evolution Data Optimized (EVDO), Long Term Evolution-Advanced (LTE-Advanced), Multichannel Multipoint Distribution Service (MMDS), and so forth.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of, data-processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially-generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

As will be recognized by those skilled in the art, the innovative concepts described herein may be modified and varied over a wide range of applications. Accordingly, the scope of claimed subject matter should not be limited to any of the specific exemplary teachings discussed above, but is instead defined by the following claims.

What is claimed is:

1. A method for image processing to form an output feature map (OFM), the method comprising:
    selecting, by a pipelined structure of a device, activation values in an input feature map (IFM) in each of a predetermined number of input channels of a neural network configured within the device, the activation values being stored in a first memory of the device, each IFM comprising a first predetermined size, and a position in the IFM of each selected activation value being a same position as selected activation values in other IFMs from which the other selected activation values are selected;
    transforming on-the-fly the selected activation values to a Winograd domain by the pipelined structure, wherein the activation values are transformed in a first phase transformation and a second phase transformation, the device including at least one intermediate register to store intermediate results of the first phase transformation and the second phase transformation;

selecting, by the pipelined structure, an element in a Winograd filter in each of the predetermined number of input channels, each Winograd filter being stored in a second memory of the device and each Winograd filter corresponding to a kernel filter comprising the first predetermined size, each selected element in a Winograd filter corresponding to an activation value in the Winograd domain, and a position of each respective element in the Winograd filter from which the element is selected being a same position as another selected element in the Winograd filter from which the another element is selected;

multiplying, by a multiplier of the device, a transformed activation value in the Winograd domain by a corresponding element in a Winograd filter to form a corresponding product value in the Winograd domain;

repeatedly selecting, by the pipelined structure, activation values from an IFM in each of the predetermined number of input channels stored in the first memory, transforming the selected activation values on-the-fly to the Winograd domain, selecting an element in a Winograd filter stored in the second memory that corresponds to a currently transformed activation value in the Winograd domain, and multiplying, by the multiplier, the currently transformed activation value and the corresponding element to form a corresponding product value in the Winograd domain until all activation values of the IFM have been transformed and multiplied by the corresponding element;

summing, by an adder of the device, the respective product values in the Winograd domain to form elements of a feature map in the Winograd domain; and inverse-Winograd transforming on-the-fly, by an inverse-Winograd transformer of an image processing unit of the device, the elements of the feature map in the Winograd domain to an original domain of the activation values to form an OFM, the OFM comprising a second predetermined size;

wherein the activation values are transformed in a first phase transformation of the pipelined structure and a second phase transformation of the pipelined structure, the device including at least one intermediate register to store intermediate results of the first phase transformation and the second phase transformation.

2. The method of claim 1, wherein repeatedly selecting activation values from an IFM in each of the predetermined number of input channels, transforming the selected activation values on-the-fly to the Winograd domain, selecting an element in a Winograd filter that corresponds to a currently transformed activation value in the Winograd domain, and multiplying the currently transformed activation value and the corresponding element to form a corresponding product value in the Winograd domain is done in parallel in the device for the predetermined number of input channels.

3. The method of claim 1, wherein the first predetermined size of an IFM and of a Winograd filter comprises a 4×4 array, and the second predetermined size of the OFM comprises a 2×2 array.

4. The method of claim 1, wherein the predetermined number of input channels comprises 16.

5. The method of claim 1, wherein the first predetermined size of each of the Winograd filters corresponds to one of a 3×3 weight kernel, a 1×3 weight kernel, and a 3×1 weight kernel.

6. The method of claim 1, wherein the first predetermined size of each IFM comprises a third predetermined number of rows and a fourth predetermined number of columns, the third predetermined number and the fourth predetermined number being greater than one, and wherein transforming on-the-fly, by the pipelined structure, the selected activation values to a Winograd domain comprises:

selecting two first activation values in a row of an IFM;

transforming the two selected first activation values to be a first intermediate value;

selecting two second activation values, each second activation value being selected from a column from which a first activation value has been selected;

transforming the selected two activation values to a second intermediate value; and combining the first intermediate value and the second intermediate value to transform on-the-fly the selected activation values to the Winograd domain.

7. The method of claim 6, wherein transforming on-the-fly the selected activation values to a Winograd domain is performed in a pipelined manner by the pipelined structure.

8. A system to convolve input feature map (IFM) values of a neural network with weight kernel values of the neural network, the system comprising:

a device comprising a first memory, a pipelined structure, a second memory, a multiplier, an adder tree and an inverse-Winograd transformer, the neural network being configured within the device, the first memory storing activation values of an IFM for each of a predetermined number of input channels, each IFM comprising a first predetermined size;

the pipelined structure selecting activation values from an IFM in each of the predetermined number of input channels, a position in the IFM of each selected activation value being a same position as selected activation values in other IFMs from which the other selected activation values are selected, the pipelined structure transforming on-the-fly the selected activation values to a Winograd domain;

the second memory storing elements of a Winograd filter for each of the predetermined number of input channels, each Winograd filter corresponding to a kernel filter comprising the first predetermined size;

the multiplier multiplying a transformed activation value in the Winograd domain by a selected element from a Winograd filter to form a corresponding product value in the Winograd domain, each selected element in a Winograd filter corresponding to an activation value in the Winograd domain, and a position of each respective element in the Winograd filter from which the element is selected being a same position as another selected element in the Winograd filter from which the another element is selected;

the adder tree summing the respective product values in the Winograd domain to form elements of a feature map in the Winograd domain; and the inverse-Winograd transformer of an image processing unit transforming on-the-fly the elements of the feature map in the Winograd domain to an original domain of the activation values to form an output feature map (OFM) for storage in the memory, the OFM comprising a second predetermined size;

wherein the activation values are transformed in a first phase transformation of the pipelined structure and a second phase transformation of the pipelined structure, the device including at least one intermediate register to store intermediate results of the first phase transformation and the second phase transformation.

9. The system of claim 8, wherein the first predetermined size of an IFM and of a Winograd filter comprises a 4×4 array, and the second predetermined size of the OFM comprises a 2×2 array.

10. The system of claim 8, wherein the predetermined number of input channels comprises 16.

11. The system of claim 8, wherein the first predetermined size of each of the Winograd filters corresponds to one of a 3×3 weight kernel, a 1×3 weight kernel, and a 3×1 weight kernel.

12. The system of claim 8, wherein the first predetermined size of each IFM comprises a third predetermined number of rows and a fourth predetermined number of columns, the third predetermined number and the fourth predetermined number being greater than one, and wherein the pipelined structure further:

selects two first activation values in a row of an IFM;

transforms the two selected first activation values to be a first intermediate value;

selects two second activation values, each second activation value being selected from a column from which a first activation value has been selected;

transforms the selected two activation values to a second intermediate value; and combines the first intermediate value and the second intermediate value to transform on the fly the selected activation to the Winograd domain.

* * * * *